(12) United States Patent
Ge et al.

(10) Patent No.: US 11,801,632 B2
(45) Date of Patent: Oct. 31, 2023

(54) MULTI-MATERIAL PHOTOCURING 3D PRINTER AND 3D PRINTING METHOD

(71) Applicant: SOUTHERN UNIVERSITY OF SCIENCE AND TECHNOLOGY, Shenzhen (CN)

(72) Inventors: Qi Ge, Shenzhen (CN); Jianxiang Cheng, Shenzhen (CN)

(73) Assignee: SOUTHERN UNIVERSITY OF SCIENCE AND TECHNOLOGY

( * ) Notice: Subject to any disclaimer, the term of this patent is extended or adjusted under 35 U.S.C. 154(b) by 126 days.

(21) Appl. No.: 17/230,616

(22) Filed: Apr. 14, 2021

(65) Prior Publication Data

US 2022/0234281 A1 Jul. 28, 2022

(30) Foreign Application Priority Data

Jan. 25, 2021 (CN) .......................... 202110099819.8

(51) Int. Cl.
*B29C 64/124* (2017.01)
*B33Y 30/00* (2015.01)
(Continued)

(52) U.S. Cl.
CPC .......... *B29C 64/124* (2017.08); *B29C 64/241* (2017.08); *B29C 64/35* (2017.08);
(Continued)

(58) Field of Classification Search
CPC ... B29C 64/124; B29C 64/129; B29C 64/135; B29C 64/35; B29C 64/241
See application file for complete search history.

(56) References Cited

U.S. PATENT DOCUMENTS

| 2006/0022379 A1* | 2/2006 | Wicker | B33Y 70/00 264/401 |
| 2008/0169589 A1* | 7/2008 | Sperry | B33Y 30/00 264/494 |
| 2021/0308947 A1 | 10/2021 | Diez et al. | B29C 64/35 |

FOREIGN PATENT DOCUMENTS

| CN | 206690538 | 12/2017 | ............ B33Y 30/00 |
| CN | 111674037 | 9/2020 | ............ B29C 64/35 |

(Continued)

OTHER PUBLICATIONS

Fiore (Monolithic Power, "Stepper Motors Basics: Types, Uses, and Working Principles", Nov. 4, 2022) (Year: 2022).*
(Continued)

*Primary Examiner* — Joseph S Del Sole
*Assistant Examiner* — Ariella Machness
(74) *Attorney, Agent, or Firm* — HAYES SOLOWAY P.C.

(57) ABSTRACT

The present disclosure provides a multi-material photocuring 3D printer and a 3D printing method, wherein multi-material photocuring 3D printer comprises: a frame; a printing platform, arranged on frame; a lifting device, arranged on printing platform; a rotary motor, arranged on lifting device; a printing plate, arranged on rotary motor; wherein a bottom surface of printing plate is a printing plane; a plurality of resin slots, arranged on frame and located below printing plate; an optical engine, arranged on frame and located below printing plate. The present disclosure connects printing plate with rotary motor, after finishing printing with one material, it is possible to remove residual liquid resin on printed piece and printing plane by a method of high-speed centrifugation, to avoid any contaminations to printed piece, thereby ensuring printed piece in multi-material having a high precision and a high resolution.

8 Claims, 6 Drawing Sheets

(51) Int. Cl.
*B33Y 40/00* (2020.01)
*B33Y 50/02* (2015.01)
*B29C 64/393* (2017.01)
*B29C 64/241* (2017.01)
*B29C 64/35* (2017.01)
*B33Y 10/00* (2015.01)

(52) U.S. Cl.
CPC ............ *B29C 64/393* (2017.08); *B33Y 10/00* (2014.12); *B33Y 30/00* (2014.12); *B33Y 40/00* (2014.12); *B33Y 50/02* (2014.12)

(56) References Cited

FOREIGN PATENT DOCUMENTS

| | | | | |
|---|---|---|---|---|
| CN | 211515922 | 9/2020 | ............. | B21F 23/00 |
| KR | 101909824 B1 | * 10/2018 | | |
| WO | WO2020/030338 | 2/2020 | ............. | B29C 64/35 |

OTHER PUBLICATIONS

Wikipedia: "Rotary Stage", https://en.wikipedia.org/wiki/Rotary_stage, May 22, 2022 (Year: 2022).*
Office Action issued in Chinese Application No. 202110099819.8 dated May 7, 2022, with translation, 31 pgs.

* cited by examiner

MULTI-MATERIAL PHOTOCURING 3D PRINTER AND 3D PRINTING METHOD

CROSS-REFERENCES TO RELATED APPLICATIONS

This application claims priority to Chinese Patent Application No. 202110099819.8, filed on Jan. 25, 2021, the content of all of which is incorporated herein by reference.

FIELD OF THE INVENTION

The present disclosure relates to the technical field of 3D printing, more particularly, to a multi-material photocuring 3D printer and a 3D printing method.

BACKGROUND

Currently, in a field of photo-curing 3D printing, there are a plurality of graphic methods mainly including: Digital Light Procession (DLP), Liquid Crystal Display (LCD), Stereo Lithography Apparatus (SLA), and more.

A conventional photocuring 3D printing method is able to print with only one material in a single printing, and unable to achieve a switched printing between multiple materials, or a combination with a soft material and a hard material, as well as unable to achieve a multi-material photocuring 3D printing.

At present, although there have been a plurality of studies on a multi-material DLP 3D printing, most are achieved by adding an amount of resin slots to achieve a multi-material printing, however such a method may cause a serious pollution to a printed piece, thus still having a certain distance away from a target of a high precision and a multi-material. Therefore, a technical core of the multi-material photocuring 3D printing is cleaning a residual liquid when switching a material, so as to ensure that there is no pollution introduced. Therefore, a switching method of adding resin slots only, cannot really solve a problem.

In order to avoid from having a pollution induced during switching the resin slots, generally a cleaning slot and a drying slot will be added, wherein the cleaning slot has alcohol or other organic solvents contained, being able to clean and remove the resin on a surface of the printed piece, and the drying slot dries and removes a residual cleaning liquid on the surface of the printed piece, followed by printing with a second material. Although such a cleaning and drying method is able to remove most residual liquid, it still has a plurality of drawbacks: first, a plurality of repeated cleaning may cause damaging a printed structure, making a dimensional accuracy of the printed piece decrease. In addition, adding a cleaning process cannot be truly pollution-free, while there are still some residual organic solvent on the surface of the printed piece, causing inducing a new pollution repeatedly, thus resulting in a decrease in a resolution of the printed piece.

Therefore, the current technology needs to be improved and developed.

BRIEF SUMMARY OF THE DISCLOSURE

According to the above described defects in the prior art, a purpose of the present disclosure is providing a multi-material photocuring 3D printer and a 3D printing method, to solve a problem in the prior art that the accuracy and the resolution of the printed piece decrease due to cleaning and removing the resin on the surfaces of the printed pieces in an existing multi-material photocuring 3D printer.

A technical solution of the present disclosure to solve the technical problems is as follows:

a multi-material photocuring 3D printer, comprising:
 a frame;
 a printing platform, arranged on the frame;
 a lifting device, arranged on the printing platform;
 a rotary motor, arranged on the lifting device;
 a printing plate, arranged on the rotary motor; wherein a bottom surface of the printing plate is a printing plane;
 a plurality of resin slots, arranged on the frame and located below the printing plate;
 an optical engine, arranged on the frame and located below the printing plate.

A further configuration of the present disclosure, wherein the multi-material photocuring 3D printer comprises:
 a locking device, arranged on the lifting device;
 the rotary motor is arranged on the locking device;
 wherein the printing plate restores to an initial absolute position through the locking device.

A further configuration of the present disclosure, wherein the locking device comprises:
 a bracket;
 a first cylinder, arranged on the bracket;
 a clamping assembly, arranged on the first cylinder;
 a clamped piece, arranged on the rotary motor and located at a middle position of the clamping assembly;
 wherein, the rotary motor is a double axis high-speed DC motor, the printing plate connects to a bottom end of the rotary motor through a flange coupling, and the clamped piece is arranged on a top end of the rotary motor.

A further configuration of the present disclosure, wherein the clamping assembly further comprises:
 two clamping blocks, the clamping blocks are arranged oppositely on the first cylinder;
 a clamping permanent magnet, arranged in the clamping block;
 the clamped piece comprising:
 a clamped block, arranged above the rotary motor;
 a rotary permanent magnet, arranged in the clamped block.

A further configuration of the present disclosure, wherein the multi-material photocuring 3D printer further comprises:
 two resin collection devices, the resin collection devices are arranged oppositely on the frame; wherein, the resin collection device comprises:
 a first connecting plate, arranged on the frame;
 a second cylinder, arranged on the first connecting plate;
 a second connecting plate, arranged on the second cylinder;
 a third cylinder, arranged on the second connecting plate;
 a first collection slot, arranged on the third cylinder;
 wherein, an extension direction of the third cylinder is perpendicular to an extension direction of the second cylinder.

A further configuration of the present disclosure, wherein the multi-material photocuring 3D printer further comprises:
 two post-curing devices, the post-curing devices are arranged oppositely and located on a side of the resin collection device; wherein, the post-curing device comprises:
 a third connecting plate, arranged on the frame;
 a fourth cylinder, arranged on the third connecting plate;
 a fourth connecting plate, arranged on the fourth cylinder;

a fifth cylinder, arranged on the fourth connecting plate;
a post-curing slot, arranged on the fifth cylinder;
a UV curing light-emitting diode, arranged on the post-curing slot;
wherein, an extension direction of the fifth cylinder is perpendicular to an extension direction of the fourth cylinder.

A further configuration of the present disclosure, wherein the multi-material photocuring 3D printer further comprises:
a resin slot switching device, arranged on the frame;
the resin slots are arranged on the resin slot switching device;
wherein, the resin slot switching device comprises:
a driving assembly, arranged on the frame;
a leveling plate, arranged on the driving assembly;
a base plate, arranged on the leveling plate; wherein the resin slots are arranged on the base plate at an interval;
a plurality of first leveling assemblies, arranged on the leveling plate and connected to the base plate; wherein, the first leveling assembly comprises:
a fifth connecting plate, connected to the base plate;
a first bolt, inserted through the fifth connecting plate;
a first spring, sleeved on the first bolt;
a first screw block, arranged on the leveling plate, and threadedly connected with the first bolt.

A further configuration of the present disclosure, wherein the printing platform comprises:
a plurality of second adjusting assemblies, the plurality of second adjusting assemblies are arranged on the bracket, and connected with the printing platform; wherein, the second adjusting assembly comprises:
a second bolt, penetrating through the printing platform;
a second spring, sleeved on the second bolt;
a second screw block, arranged on the frame and threadedly connected with the second bolt.

A further configuration of the present disclosure, wherein the lifting device comprises:
a first mounting dock, arranged on the printing platform;
a first driving motor, arranged on the first mounting dock and connected with the bracket;
the driving assembly comprises:
a second mounting dock, arranged on the frame;
a second driving motor, arranged on the second mounting dock and connected with the leveling plate.

According to a same inventive concept, the present disclosure further provides a printing method for the multi-material photocuring 3D printer, applied to the multi-material photocuring 3D printer stated above, wherein the method comprises:
adjusting a distance from the printing plane to the bottom surface of the resin slot, to make a focal point of the optical engine align with the bottom surface of the resin slot; wherein the resin slot has a resin material placed in, and the material in each of the resin slot is corresponding to a material set in a 3D model of the printed piece;
controlling the lifting device to move the printing plane to a distance having a thickness of one slice layer from the bottom surface of the resin slot;
controlling the optical engine project a projection pattern corresponding to the current layer, to complete printing the current layer;
wherein, if there is any other material existing in the current layer, or a material of a next layer is inconsistent with the material of the current layer, then controlling the rotary motor to spin, so as to remove any residual resin liquid on the printed piece and the printing plane by a method of spinning and centrifugation.

A further configuration of the present disclosure, the method further comprises:
collecting the residual resin liquid after removing the residual resin liquid on the printing plane, when it is needed to switch to another material for printing.

A further configuration of the present disclosure, the method further comprises:
performing a post-curing process on a designated layer.

The present disclosure provides a multi-material photocuring 3D printer and a 3D printing method, wherein the multi-material photocuring 3D printer comprises: a frame; a printing platform, arranged on the frame; a lifting device, arranged on the printing platform; a rotary motor, arranged on the lifting device; a printing plate, arranged on the rotary motor; wherein a bottom surface of the printing plate is a printing plane; a plurality of resin slots, arranged on the frame and located below the printing plate; an optical engine, arranged on the frame and located below the printing plate. The present disclosure connects the printing plate with the rotary motor, after finishing printing with one material, it is possible to remove the residual liquid resin on the printed piece and the printing plane by a method of high-speed centrifugation, to avoid any contaminations to the printed piece, thereby ensuring the printed piece in multi-material having a high precision and a high resolution.

BRIEF DESCRIPTION OF THE DRAWINGS

In order to describe the embodiments of the present disclosure or the technical solutions in the prior art more clearly, a plurality of drawings used in the description of the embodiments or the prior art will be briefly introduced hereafter. Obviously, the drawings in the following description are some embodiments of the present disclosure only, those of ordinary skills in the present art, without any creative work, may obtain other drawings based on the structure shown in these drawings.

Numerals in the figures: 1, frame; 2, printing platform; 3, lifting device; 31, first mounting dock; 32, first driving motor; 4, rotary motor; 41, flange coupling; 5, printing plate; 6, resin slot; 7, optical engine; 71, third mounting dock; 8, locking device; 81, bracket; 82, first cylinder; 83, clamping assembly; 831, clamping block; 832, clamping permanent magnet; 84, clamped piece; 841, clamped block; 842, rotary permanent magnet; 9, resin collection device; 91, first connecting plate; 92, second cylinder; 93, second connecting plate; 94, third cylinder; 95, first collection slot; 10, post-curing device; 101, third connecting plate; 102, fourth cylinder; 103, fourth connecting plate; 104, fifth cylinder; 105, post-curing slot; 106, ultraviolet curing light-emitting diode; 11, resin slot switching device; 111, driving assembly; 1111, second mounting dock; 1112, second driving motor; 112, leveling plate; 113, base plate; 114, first leveling assembly; 1141, fifth connecting plate; 1142, first bolt; 1143, first spring; 1144, first screw block; 12, second adjusting assembly; 121, second bolt; 122, second spring; 123, second screw block.

DETAILED DESCRIPTION OF EMBODIMENTS

The present disclosure provides a multi-material photo-curing 3D printer and a 3D printing method, being able to print multi-material onto a same unit, in order to make the purpose, technical solution and the advantages of the present disclosure clearer and more explicit, further detailed descriptions of the present disclosure are stated here, referencing to the attached drawings and some embodiments of the present disclosure. It should be understood that the detailed embodiments of the disclosure described here are used to explain the present disclosure only, instead of limiting the present disclosure.

The implementations and the scope of the patent application, wherein unless specific limitations on articles are applied in the text, "a" and "the" may generally refer to a singular or a plural.

In addition, if there are descriptions related to "first", "second", and more in the embodiments of the present disclosure, the descriptions of "first", "second", and more are used for descriptive purposes only, instead of being understood as instructions or implications to its relative importance or as implicitly indications to a number of a technical feature indicated. Therefore, the features defined with "first" and "second" may explicitly or implicitly include at least one of the features. In addition, a plurality of technical solutions between various embodiments may be combined with each other, but they must be based on what can be achieved by an ordinary skilled in the art. When the combination of technical solutions is contradictory or impossible to achieve, it should be considered that such a combination of the technical solutions neither exists, nor falls within the scope of protection required by the present disclosure.

After a plurality of researches and studies, it has been found that, a technical core of a multi-material photocuring 3D printing technology lies in removing a residual liquid when switching a material. An existing method of removing the residual liquid is cleaning a cleaning slot with alcohol or a plurality of other organic solvents, performing a drying operation before printing with a second material. Such a method has a plurality of defects existing, first, a plurality of repeated cleaning may cause damaging a printed structure, and lowering a dimensional accuracy. Secondly, a material removal process thereof is complicated, time-costing and material-consuming, having a low efficiency. Finally, adding a cleaning process cannot be truly pollution-free, and there are still some residual organic solvents left on a surface of a printed piece, which, instead, causes a repeated introduction of a new pollution. In addition, there is another way to remove the residual liquids, which is removing the residual liquids on the surface of the printed piece directly by air blowing. Such a method cannot well remove the residual liquids on the surface of the printed piece either. Thus it can be seen that, the methods of removing the residual liquids when switching the materials, as mentioned above, will both reduce a printing accuracy and a resolution of the printed piece.

According to the technical problems mentioned above, the present disclosure provides a multi-material photocuring 3D printer and a printing method thereof. Wherein the 3D printer comprises: a frame; a printing platform, arranged on the frame; a lifting device, arranged on the printing platform; a rotary motor, arranged on the lifting device; a printing plate, arranged on the rotary motor; wherein a bottom surface of the printing plate is a printing plane; a plurality of resin slots, arranged on the frame and located below the printing plate; an optical engine, arranged on the frame and located below the printing plate. The present disclosure, wherein, by connecting the printing plate with the rotary motor, after finishing printing with one material, a residual liquid resin on the printed piece and the printing plane can be removed by a method of high-speed centrifugation, thereby prevents the printed piece from being contaminated and ensures a high precision and a high resolution of the printed piece with multi-material, having a great significance for an integrated molding of a flexible device and a multi-material soft driver.

Referencing to FIGS. 1 to 8 together, the present disclosure provides a preferred embodiment of the multi-material photocuring 3D printer.

Figure 1:
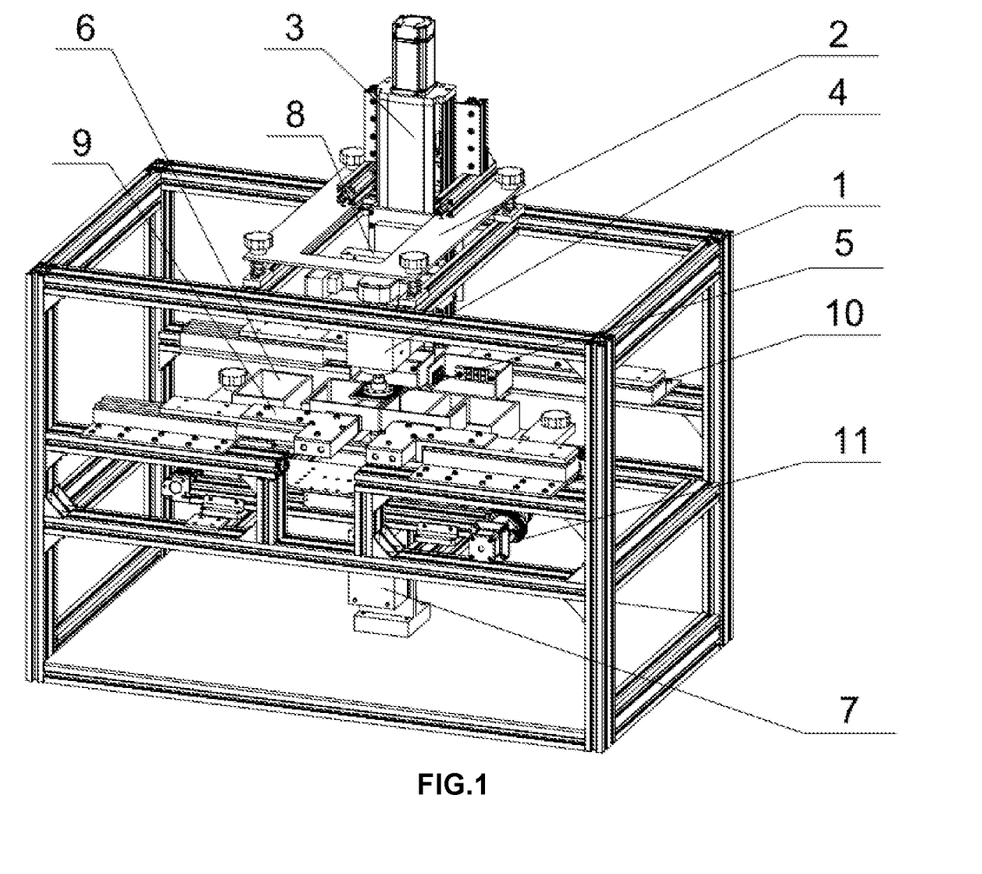
FIG. 1 illustrates a schematic diagram on an overall structure of the multi-material photocuring 3D printer in the present disclosure.

Shown as FIG. 1, the present disclosure provides a multi-material photocuring 3D printer, the multi-material photocuring 3D printer comprises: a frame 1, a printing platform 2, a lifting device 3, a rotary motor 4, a printing plate 5, a plurality of resin slots 6, and an optical engine 7. Wherein the printing platform 2 is arranged on the frame 1; the lifting device 3 is arranged on the printing platform 2; the rotary motor 4 is arranged on the lifting device 3; the printing plate 5 is arranged on the rotary motor 4; wherein a bottom surface of the printing plate 5 is a printing plane; there are a plurality of resin slots 6 arranged, and arranged in intervals on the frame 1 while located below the printing plate 5; the optical engine 7 is arranged on the frame 1 and located below the printing plate 5.

Specifically, the rotary motor 4 is a high-speed rotary motor, the printing plate 5 connects to the lifting device 3 through the rotary motor 4, while the lifting device 3 is able to drive the printing plate 5 to move along a Z-axis direction, wherein the Z-axis direction refers to a direction of a Z-axis in a three-dimensional coordinate system. In addition, the resin slot 6 has a resin material stored inside, and a material in each of the resin slot 6 is corresponding to a material set by a 3D model of the printed piece.

When printing, first it is needed to adjust a position of each hardware and clarify each material parameter, specifically, adjusting the printing platform 2 and the resin slot 6 to a horizontal state, making a bottom surface of each resin slot 6 parallel to a printing plane of the printing plate 5, before adjusting a distance from the printing plane to the bottom surface of the resin slot 6, to ensure that a focal point of the optical engine 7 (an optical projection system) is aligned with the bottom surface of the resin slot 6.

Secondly, performing a slicing process to the 3D model of the printed piece, and dividing each part of a different material into a picture corresponding to the material, wherein the pictures may be divided into two cases: one layer containing one material and one layer containing multiple materials. After confirming that the material in each resin slot 6 is corresponding to the material set by the 3D model, a plurality of printing parameters will be set. After the printing parameters are set, controlling the printing plane by the lifting device 3 move to a distance having a one-layer thickness from the bottom surface of the resin slot 6, then the optical engine 7 projects a projection pattern corresponding to a current layer. In an embodiment, when printing a first layer, the printing plane is adjusted to a distance having a thickness of the first layer from the bottom surface of the resin slot 6. When the printing plane rises, the resin in the resin slot 6 will fill in a gap between the resin slot 6 and the printing plane, while the optical engine 7 projects a pattern of the first layer in the 3D model and irradiates on a liquid resin, before performing a photocuring and molding, that completes printing the first layer. After finishing printing the first layer, the lifting device 3 lifts the printing plate 5 up for a certain distance (for example, lifting up a distance of 4 to 5 layers) before moving to a height of a next layer, to ensure that the resin can fill completely a thickness of the new layer. When the printing plate 5 is adjusted to a position of a second layer and the resin has filled a thickness of the second layer, the optical engine 7 projects a shape pattern of the second layer onto the resin, before finishing printing the second layer. By a plurality of repeated operations, it is able to print the model in a stacked form.

Wherein, if there is only one material in the current layer, and a material in a next layer is consistent with the material in the current layer, then controlling the lifting device 3 to raise the printing plane for a certain distance before moving to the position of the next layer. For example, if the materials of the first layer and the second layer are the same, then it is possible to print the next layer directly.

If the current layer has another material exist, or the material of the next layer is inconsistent with that of the current layer, then the rotary motor 4 is controlled to spin, in order to remove the residue resin liquid on the printed piece and the printing plane through a method of spinning and centrifugation. In an embodiment, the first layer has another material existing, or the material of the second layer to print is inconsistent with that of the first layer, then it is needed to clean the printed piece and the printing plane before performing printing. That is, when switching the material for printing is needed, it shall clean a previous liquid resin before printing with another resin material, specifically, after finishing printing with one resin material, the printing plate 5 is unplugged, since the printing plate 5 is connecting to the rotary motor 4, thus under a high-speed spinning of the rotary motor 4, it is possible to clean out the liquid resin on the printed piece and the printing plane in a method of spinning and centrifugation.

It can be seen that, the present disclosure connects the printing plate 5 with the rotary motor 4, after finishing printing with one material, it is possible to remove the residual liquid resin on the printed piece and the printing plane by a method of a high-speed centrifugation, without using alcohol or any organic solvents. It is possible to avoid any residual organic solvents on the printed piece, thereby avoiding a repeated introduction of a new pollution, ensuring a resolution requirement of the printed piece, and also it is possible to avoid damages to a structure of the printed piece due to repeated cleaning, ensuring an accuracy requirement of the printed piece. In addition, the present disclosure removes the residual liquid resin in a method of spinning and centrifugation, having a simple process, also no organic solvent is required, which not only improves a cleaning efficiency, but also saves materials, thereby saving costs.

It should be noted that, when configuring a plurality of printing parameters, according to a viscosity of a printing liquid, a spinning speed of the printing platform 2 is configured to ensure that the material is able to be effectively removed. In addition, it is possible to summarize, by a plurality of experiments, the printing parameters required for each material, as well as the spinning speed and the time required to clean a residual liquid by spinning and centrifugation, and according to a property of the material, determining whether a post-curing is required. If necessary, a light intensity and a spacer layer shall be adjusted appropriately.

Figure 2:
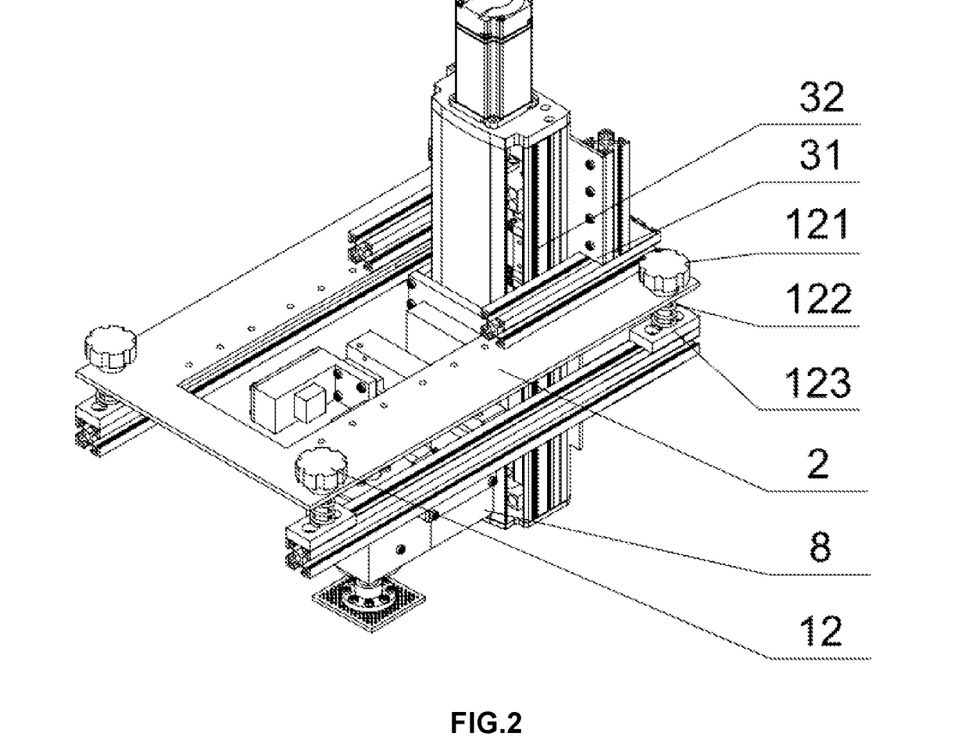
FIG. 2 illustrates a schematic diagram on a structure of the printing platform and the second adjusting assembly in the present disclosure.

Referencing to FIG. 1 and FIG. 2, in a further implementation of an embodiment, the multi-material photocuring 3D printer further comprises: a locking device 8, the locking device 8 is arranged on the lifting device 3; the rotary motor 4 is arranged on the locking device 8. Wherein, the printing plate 5 restores to an initial absolute position by the locking device 8.

Specifically, a locking device 8 is further arranged between the rotary motor 4 and the lifting device 3. After the rotary motor 4 drives the printing plate 5 and completes cleaning the residual liquid resin, the rotary motor 4 stops spinning. And the rotary motor 4 can be restored to the initial absolute position by the locking device 8. Since the printing plate 5 connects to the rotary motor 4, the printing plate 5 may also restore to an initial absolute position state, the initial absolute position of the rotary motor 4 is locked, and the printing plane is indirectly locked as well. Therefore, after the printing plane spins at a high speed to remove the residual resin, it is possible to always maintain the initial absolute position, thereby ensuring that the printed piece will not appear a misaligned state.

Figure 3:
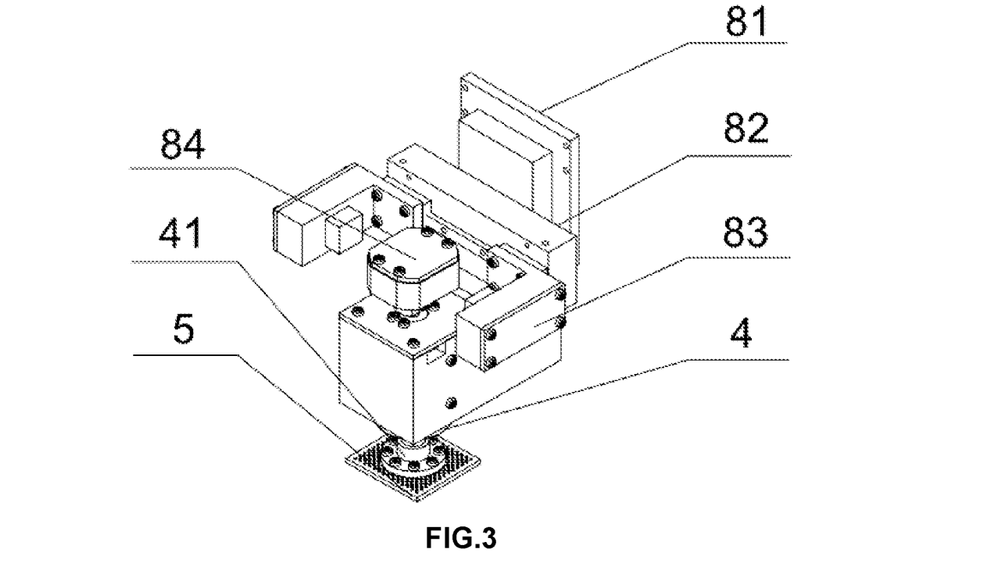
FIG. 3 illustrates a schematic diagram on a structure of the rotary motor and the locking device in the present disclosure.

Referencing to FIG. 2 and FIG. 3, in a further implementation of an embodiment, the locking device 8 comprises: a bracket 81, a first cylinder 82, a clamping assembly 83, and a clamped piece 84. Wherein, the first cylinder 82 is arranged on the bracket 81; the clamping assembly 83 is arranged on the first cylinder 82; the clamped piece 84 is arranged on the rotary motor 4 and located at a middle position of the clamping assembly 83. Wherein, the rotary motor 4 is a double axis high-speed DC motor, the printing plate 5 connects to a bottom end of the rotary motor 4 through a flange coupling 41, and the clamped piece 84 is arranged on a top end of the rotary motor 4.

Specifically, the bracket 81 is arranged on the lifting device 3, the clamping assembly 83 is arranged on the first cylinder 82, and the clamped piece 84 is arranged on an upper end of the rotary motor 4 and located at a middle position of the clamping assembly 83, while the printing plate 5 is arranged at a lower end of the rotary motor 4. When the rotary motor 4 is in a spinning state, the clamping assembly 83 is also in an open state under an action of the first cylinder 82, while the clamped piece 84 can spin freely. Similarly, the printing plane can also spin freely. Under a high-speed driving of the rotary motor 4, the clamped piece 84 spins synchronously with the printing plane, to realize removing the residual resin. When the rotary motor 4 is in a locked state, the rotary motor 4 stops rotating, while the clamping assembly 83 is in a closed state under an action of the first cylinder 82, the clamping assembly 83 clamps the clamped piece 84, so as to restore the clamped piece 84 to an original absolute position thereof. At this time, since the clamped piece 84 and the printing plane both connect to the rotary motor 4, thus the printing plane will also restore to an initial absolute position state.

Figure 4:
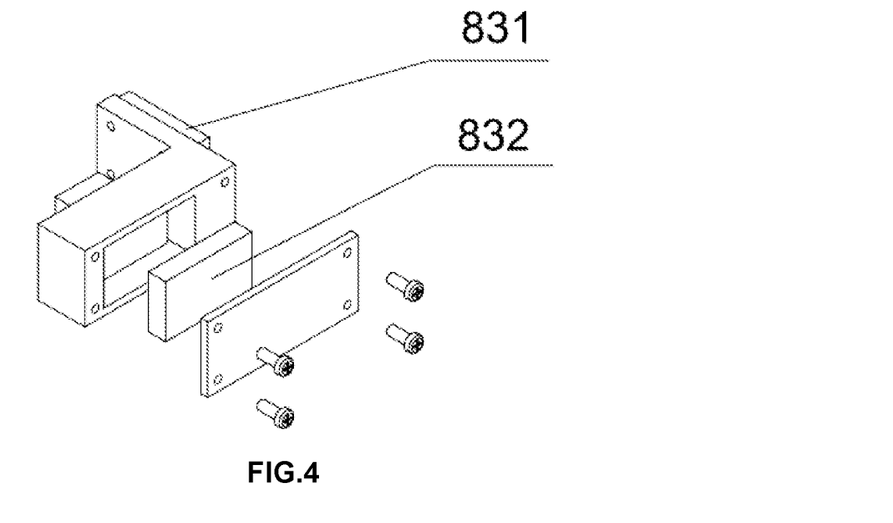
FIG. 4 illustrates a schematic diagram on a structure of the clamping assembly in the present disclosure.

Referencing to FIG. 3 and FIG. 4, in a further implementation of an embodiment, the clamping assembly 83 comprises: a clamping block 831 and a clamping permanent magnet 832, wherein two of the clamping block 831 are arranged, and arranged oppositely on the first cylinder 82, and the clamping permanent magnet 832 is arranged in the clamping block 831. In a plurality of embodiments, the first cylinder 82 is a double-slider cylinder, and the clamping blocks 831 are arranged on both sides of the first cylinder 82 respectively.

Figure 5:
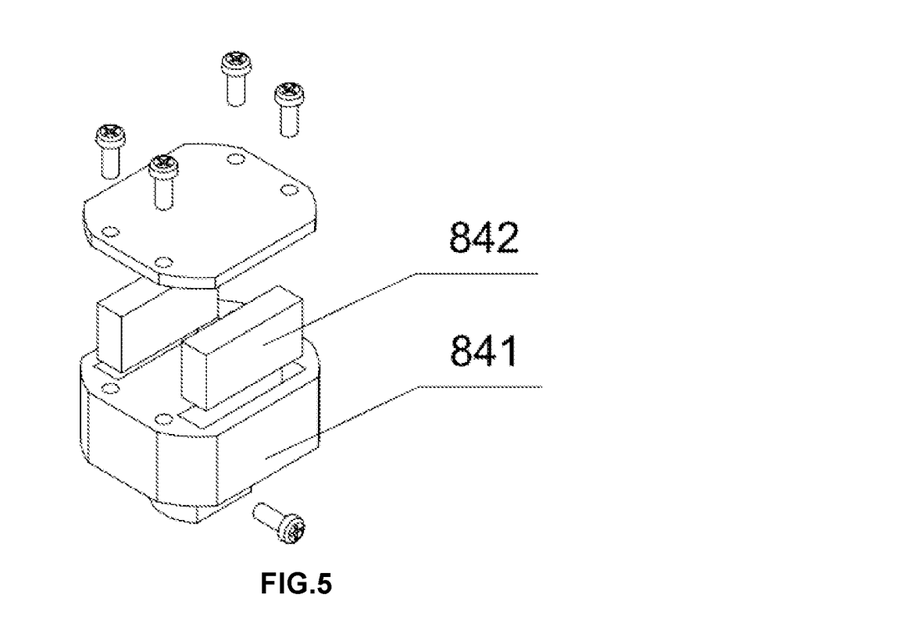
FIG. 5 illustrates a schematic diagram on a structure of the clamped piece in the present disclosure.

Furthermore, referencing to FIG. 5, the clamped piece 84 comprises: a clamped block 841 and a rotary permanent magnet 842, wherein the clamped block 841 is arranged above the rotary motor 4, and the rotary permanent magnet 842 is arranged in the clamped block 841.

Specifically, the clamping assembly 83 is a magnetic clamping assembly 83. The clamping permanent magnet 832 and the rotary permanent magnet 842 can attract each other, after the rotary motor 4 is powered off, under an action of a magnetic force, a relative balance will be maintained, and such a balance state is the initial absolute position of the clamped piece 84. Thus, after the rotary motor 4 stops spinning, the clamping assembly 83 is clamped tightly by the first cylinder 82, so as to clamp the clamped piece 84, and a lock of the initial absolute position of the clamped piece 84 will be achieved. It can be understood that, after the initial position of the clamped piece 84 is locked, the printing plate 5 will be indirectly locked. Therefore, after the printing plane of the printing plate 5 spinning at a high speed and removing the residual resin, it is possible to always maintain the initial absolute position, thus ensuring that the printed piece will not appear a misaligned state between layers.

It should be noted that, in some embodiments, it is also possible to use a high-precision closed-loop servo motor to control the printing plane be able to restore to the initial absolute position. However, a cost of adopting a high-precision closed-loop servo motor is relatively high, which is much higher than the locking device 8 provided in the present disclosure.

Figure 6:
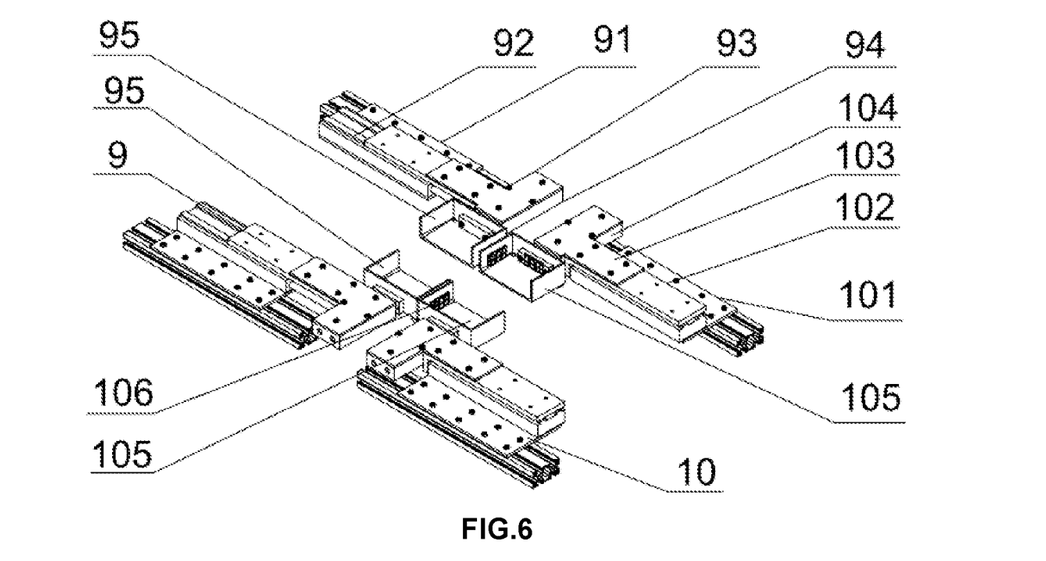
FIG. 6 illustrates a schematic diagram on a structure of the resin collection device and a structure of the post-curing device in the present disclosure.

Referencing to FIG. 1 and FIG. 6, in a further implementation of an embodiment, the multi-material photocuring 3D printer further comprises: two resin collection devices 9, the resin collection devices 9 are arranged oppositely on the frame 1, when the rotary motor 4 removes the residual liquid on the printed piece and the printing plane, they are used to collect the residual liquid after cleaning.

In a plurality of embodiments, the resin collection device 9 comprises: a first connecting plate 91, a second cylinder 92, a second connecting plate 93, a third cylinder 94, and a first collection slot 95. Wherein the first connecting plate 91 is arranged on the frame 1, the second cylinder 92 is arranged on the first connecting plate 91, the second connecting plate 93 is arranged on the second cylinder 92, the third cylinder 94 is arranged on the second connecting plate 93, the first collection slot 95 is arranged on the third cylinder 94, wherein an extension direction of the third cylinder 94 is perpendicular to an extension direction of the second cylinder 92.

Specifically, the second cylinder 92 and the third cylinder 94 are combined into a two-stage cylinder, wherein the second cylinder 92 is a rail cylinder, the third cylinder 94 is an ejection cylinder, the second cylinder 92 is mounted on the bracket 81 through the first connecting plate 91, the third cylinder 94 connects to the second cylinder 92 through the second connecting plate 93, and the first collection slot 95 is fixed on an end of the third cylinder 94. When the rotary motor 4 needs to clear the residual liquid on the printed piece and the printing plane, the second cylinder 92 extends, and the third cylinder 94 moves a certain distance under an action of the second cylinder 92, followed by the third cylinder 94 also extending, and that makes it possible to push the first collection slot 95 out for a certain distance, that is, the first collection slot 95 is in an ejected state at this time, when the printing plate 5 locates in the first collection slot 95. Thus, under an action of the rotary motor 4, the residual liquid removed from the printed piece and the printing plane due to the high-speed spinning and centrifugation will flow into the first collection slot 95.

In some embodiments, a bottom surface of the first collection slot 95 has a plurality of first through holes arranged (not shown in the FIGS.), and the first through holes connect to a catheter (not shown in the FIGS.), the residual liquid collected in the first collection slot 95 may be drained through the catheter and collected in a collection box.

Continue referencing to FIG. 1 and FIG. 6, in a further implementation of an embodiment, the multi-material photocuring 3D printer further comprises: two post-curing devices 10, the post-curing devices 10 are arranged oppositely and located on a side of the resin collection device 9. When a printing material is relatively soft, since a strength after curing is also relatively low, in order to prevent a printed piece from being thrown out after multiple high-speed centrifugation, thus a post-curing device 10 is required to perform a post-curing process on a designed layer of a cured material, before performing printing a next layer.

In a plurality of embodiments, the post-curing device 10 comprises: a third connecting plate 101, a fourth cylinder 102, a fourth connecting plate 103, a fifth cylinder 104, a post-curing slot 105, and an ultraviolet curing light-emitting diode 106. Wherein, the third connecting plate 101 is arranged on the frame 1, the fourth cylinder 102 is arranged on the third connecting plate 101, the fourth connecting plate 103 is arranged on the fourth cylinder 102, the fifth cylinder 104 is arranged on the fourth connecting plate 103, the post-curing slot 105 is arranged on the fifth cylinder 104, the ultraviolet curing light-emitting diode 106 is arranged on the post-curing slot 105, wherein, an extension direction of the fifth cylinder 104 is perpendicular to an extension direction of the fourth cylinder 102.

Specifically, the fourth cylinder 102 and the fifth cylinder 104 are combined into a two-stage cylinder, the fourth cylinder 102 is mounted on the bracket 81 through the third connecting plate 101, and the fifth cylinder 104 connects to the fourth cylinder 102 through the fourth connecting plate 103, and the post-curing slot 105 is installed at an end of the fifth cylinder 104. After finishing printing one layer, the fourth cylinder 102 pushes out and pushes the fifth cylinder 104 out for a certain distance. Now the fifth cylinder 104 pushes out and pushes the post-curing slot 105 out. Now the printing plate 5 locates in the post-curing slot 105, and the current layer is post-cured by the ultraviolet curing light-emitting diode 106 on the post-curing slot 105, before performing a next layer print or a same layer print. The present disclosure, by adding the post-curing device 10, is possible to achieve curing while printing, thereby ensuring that an entire printed piece is completely cross-linked and has a higher strength, even after multiple centrifugal spinning, the printed piece will not appear a phenomenon of being thrown out or broken.

It should be noted that, a DLP3D printing is a photocuring 3D printing method. A curing mechanism in printing is that an ultraviolet light makes a material in the resin generate a polymer cross-linked network, while a cross-linking is still incomplete when molding. Although it is molded, from a microscopic respect of view, it is not very dense, and it requires a post-curing process to make the polymer material inside fully crosslink. In such a way, will a modulus and a performance of the printed piece be optimal. In addition, a post-curing process of a traditional DLP 3D printing is taking the printed piece out and placing into an ultraviolet curing box for post-curing, after finishing printing the printed piece and cleaning the surface residual liquid with alcohol. The reason that the present disclosure adds a post-curing device is, when printing with some materials having a low modulus or softer, since a not fully cross-linked state is easy to be thrown off or broken by the high-speed centrifugation when a printing height is increasing. Thus a post-curing device is added, so when the printing height of the printed piece reaches a certain height, a cross-linking degree can be higher. Of course, this has another advantage, that is, the printed piece can be used directly after the printing is completed, without requiring a cleaning and curing, because this part of work has been completed during the printing process.

Figure 7:
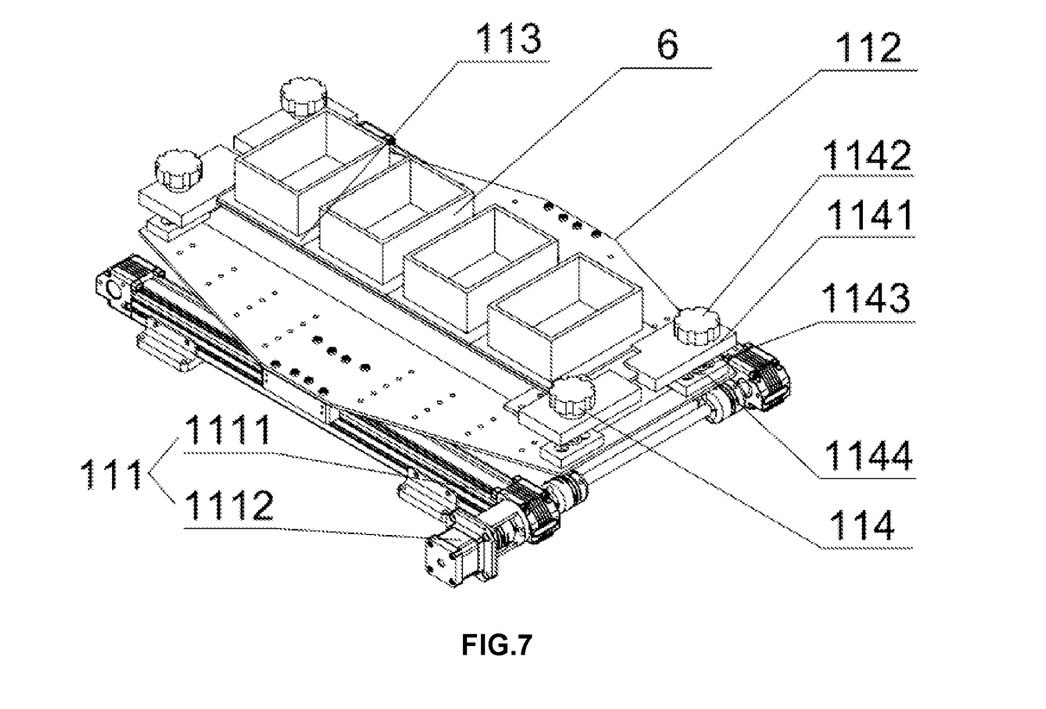
FIG. 7 illustrates a schematic diagram on a structure of the resin slot and a structure of the resin slot switching device in the present disclosure.

Referencing to FIG. 1 and FIG. 7, in a further implementation of an embodiment, the multi-material photocuring 3D printer further comprises: a resin slot switching device 11, arranged on the frame 1, the resin slot 6 is arranged on the resin slot switching device 11, through the resin slot switching device 11, it is achieved switching each resin slot 6, so as to print with different materials.

In some embodiments, the resin slot switching device 11 comprises: a driving assembly 111, a leveling plate 112, a base plate 113 and a first leveling assembly 114. Wherein, the driving assembly 111 is arranged on the frame 1, the leveling plate 112 is arranged on the driving assembly 111, the base plate 113 is arranged on the leveling plate 112, and the resin slots 6 are arranged on the base plate 113 at an interval, a plurality of the first leveling assembly 114 are arranged, and arranged on the leveling plate 112 while connected with the base plate 113. In one implementation, the first leveling assembly 114 is arranged on four corners of the leveling plate 112.

Specifically, the base plate 113 is a quartz glass base plate, and the base plate 113 is mounted on the leveling plate 112 and arranged in parallel with the leveling plate 112, while the resin slots 6 are arranged on the base plate 113 at an interval. The first leveling assembly 114 can be floated and leveled. Before printing, the leveling plate 112 may be adjusted to a horizontal state through the first leveling assembly 114, to ensure that the bottom surfaces of the plurality of resin slots 6 are on a same level, to ensure that the bottom surface of the resin slot 6 is parallel to the printing plane of the printing plate 5.

Referencing to FIG. 7, in some embodiments, the first leveling assembly 114 comprises: a fifth connecting plate 1141, a first bolt 1142, a first spring 1143, and a first screw block 1144. Wherein the fifth connecting plate 1141 is connected to the base plate 113, the first bolt 1142 is inserted through the fifth connecting plate 1141, and the first spring 1143 is inserted through the first bolt 1142, the first screw block 1144 is arranged on the leveling plate 112 and is threadedly connected with the first bolt 1142.

Specifically, the base plate 113 and the leveling plate 112 are connected together by the fifth connecting plate 1141, the first bolt 1142, and the first screw block 1144, by adjusting the first bolt 1142, it is possible to achieve a horizontal adjustment to the base plate 113, to ensure that the bottom surface of the resin slot 6 is parallel to the printing plane. Wherein, the first bolt 1142 has a first spring 1143 sleeved on, which is beneficial to control and adjust a strength of the first bolt 1142, to facilitate adjusting the base plate 113 to a horizontal state.

Referencing to FIG. 2, in a further implementation of an embodiment, the printing platform 2 comprises: a plurality of second adjusting assemblies 12, the plurality of second adjusting assemblies 12 are arranged on the bracket 81, and connected with the printing platform 2; wherein, the second adjusting assembly 12 connects to four corners of the printing platform 2, the first leveling assembly 114 can be floated and leveled, adjusting the printing platform 2 to a horizontal state through the second adjusting assembly 12, to adjust the printing plane to a horizontal state.

In some embodiments, the second adjusting assembly 12 comprises: a second bolt 121, a second spring 122 and a second screw block 123. Wherein the second bolt 121 is penetrating through the printing platform 2, the second spring 122 is sleeved on the second bolt 121, the second screw block 123 is arranged on the frame 1 and threadedly connected with the second bolt 121.

Specifically, the printing platform 2 connects to the bracket 81 through the second bolt 121 and the second screw block 123, by adjusting the second bolt 121, it is possible to achieve a horizontal adjustment of the printing platform 2, thus being able to adjust the printing plane to a horizontal state. Wherein, the second bolt 121 has the second spring 122 sleeved on, which is beneficial to control and adjust a strength of the second bolt 121, so as to adjust the printing platform 2 to the horizontal state.

Referencing to FIG. 1 and FIG. 2, in a further implementation of an embodiment, the lifting device 3 comprises: a first mounting dock 31 and a first driving motor 32, wherein the first mounting dock 31 is arranged on the printing platform 2, the first driving motor 32 is arranged on the first mounting dock 31 and connected with the bracket 81. By the first driving motor 32 driving the bracket 81 to move up and down, it is possible to achieve that the printing plate 5 moves up and down. Wherein the first driving motor 32 drives the printing plate 5 to move along a direction of a z-axis.

Referencing to FIG. 7, in a further implementation of an embodiment, the driving assembly 111 comprises: a second mounting dock 1111 and a second driving motor 1112, wherein the second mounting dock 1111 is arranged on the frame 1, the second driving motor 1112 is arranged on the second mounting dock 1111 and connected with the leveling plate 112. By the second driving motor 1112. driving the leveling plate 112 to move, so as to drive the resin slot 6 to move, thus switching the resin slot 6 is achieved. Wherein the second driving motor 1112 drives the resin slot 6 to move along a direction of a y-axis. The direction of the y-axis is the direction of y-axis in a 3D coordinate system.

Figure 8:
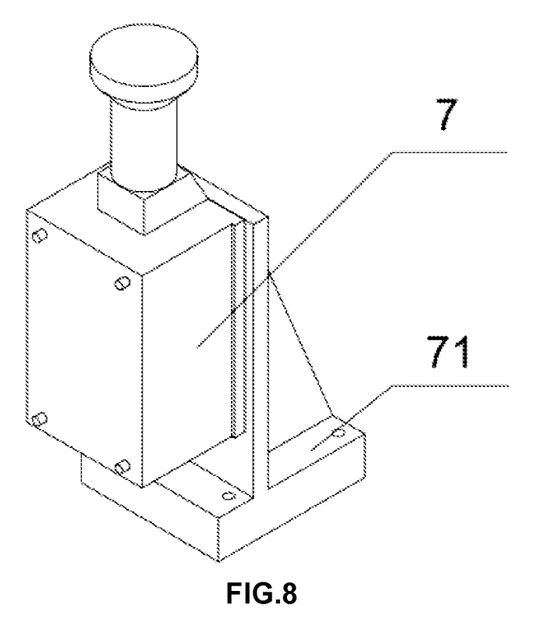
FIG. 8 illustrates a schematic diagram on a structure of the optical engine and a structure of a third mounting dock in the present disclosure.

Referencing to FIG. 1 and FIG. 8, in some embodiments, the multi-material photocuring 3D printer further comprises a third mounting dock 71, the third mounting dock 71 is arranged on the frame 1, and the optical engine 7 is arranged on the third mounting dock 71.

Figure 9:
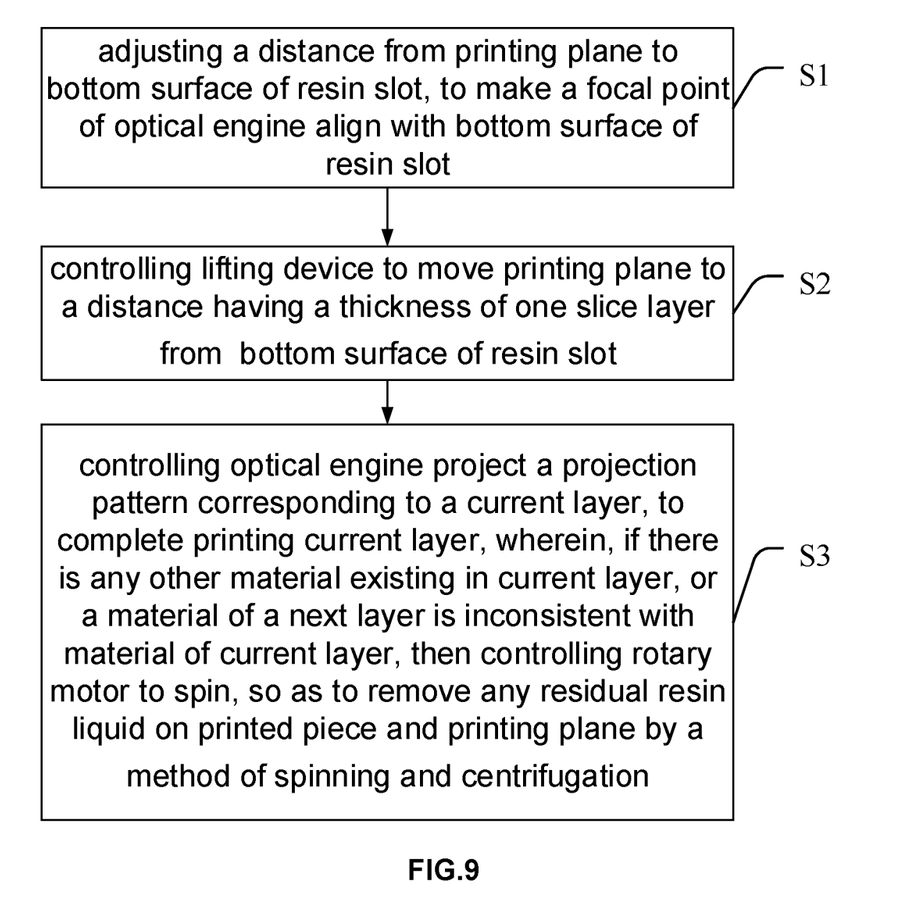
FIG. 9 illustrates a schematic flow chart on a printing method of the multi-material photocuring 3D printer in the present disclosure.

Referencing to FIG. 9, in some embodiments, the present disclosure further provides a printing method for the multi-material photocuring 3D printer, applied to the multi-material photocuring 3D printer described above, wherein the method comprises S1, adjusting a distance from the printing plane to the bottom surface of the resin slot, and making a focal point of the optical engine align with the bottom surface of the resin slot; wherein the resin slot has a resin material placed in, and the material in each of the resin slots is corresponding to a material set in a 3D model of the printed piece. Details are described as the embodiments of the multi-material photocuring 3D printer, and no more repeating herein.

S2, controlling the lifting device to move the printing plane to a distance having a thickness of one slice layer from the bottom surface of the resin slot. Details are described as the embodiments of the multi-material photocuring 3D printer, and no more repeating herein.

S3, controlling the optical engine project a projection pattern corresponding to a current layer, to complete printing the current layer. Wherein, if there is any other material in the current layer, or a material of a next layer is inconsistent with the material of the current layer, then controlling the rotary motor to spin, applied to remove any residual resin liquid on the printed piece and the printing plane by a method of spinning and centrifugation. If there is only one material in the current layer, and a material in a next layer is consistent with the material in the current layer, then controlling the lifting device to raise the printing plane for a certain distance before moving to the position of the next layer. Details are described as the embodiments of the multi-material photocuring 3D printer, and no more repeating herein.

In some embodiments, the method further comprises:

S4, collecting the residual resin liquid after removing the residual resin liquid on the printing plane, when it is needed to switch to another material for printing.

Specifically, when the materials are inconsistent, that is, the current layer has other materials exist, or the material of the next layer is inconsistent with that of the current layer, then controlling the lifting device move the printing plane to a position slightly higher than the bottom surface of the first collection slot, and ejecting the first collection slot by the first cylinder and the third cylinder on both sides, to make the first collection slot wrap the printing plane, while the clamping assembly is in an open state, and the rotary motor drives the printing plate to spin according to a speed of removing the current printing material after spinning and centrifugation. The first collection slot collects the residual liquid. After removing the residual liquid, the clamping assembly locks the printing plate at the initial absolute position, retracting the first collection slot, and controls the printing plane move into the resin slot, to print the same layer or the next layer with another material.

S5, performing a post-curing process on a designated layer.

Specifically, in addition, when a printing height is high, a printing material modulus is low, or the material has a soft property, a high-speed centrifugation will cause the printed piece to be thrown off, thus it is necessary to set a position of the designated layer and perform a post-curing process. Wherein, after removing the residual liquid by rotating and centrifugation, the first collection slot is retracted, and the fourth cylinder and the fifth cylinder eject the post-curing slot, so the post-curing slot wraps the printing plane, and at a same time, an ultraviolet curing light-emitting diode is lit up, to perform a post-curing process onto the designed layer, wherein a blinking parameter of the ultraviolet curing light-emitting diode may be preset. After the post-curing is completed, the post-curing slot is retracted, and the printing plane is controlled to move into the resin slot to print a same layer or the next layer with another material. By post-curing a printed object, it is possible to improve a degree of cross-linking in the printed piece, preventing from falling off or deforming a structure in a later printing process.

The present disclosure has a plurality of following benefits:

1, by connecting the printing plate with the rotary motor, after finishing printing with one material, it is possible to remove the residual liquid resin on the printed piece and the printing plane by a method of a high-speed centrifugation, without using alcohol or any organic solvents, being able to avoid any residual organic solvents on the printed piece, thereby avoiding a repeated introduction of a new pollution, ensuring a resolution requirement of the printed piece, and also it is possible to avoid damages to a structure of the printed piece due to repeated cleaning, ensuring an accuracy requirement of the printed piece. In addition, the present disclosure removes the residual liquid resin in a method of spinning and centrifugation, having a simple process, also no organic solvent is required, which not only improves a cleaning efficiency, but also saves materials, thereby saving costs.

2, after spinning, by a designed magnetic clamping assembly, it is possible to ensure that the printing plane returning to the original absolute position, in order to ensure that the printed pieces will not have a layer-to-layer misalignment;

3, adding the post-curing device, and improving a cross-linking degree of the printed piece, to ensure that the printed piece will not be thrown out or broken after a plurality of centrifugal rotations;

4, arranging leveling assemblies on both the printing platform and the resin slot switching device, which is able to make both the printing plane and the upper surface of the resin slot be level.

It should be understood that, the application of the present disclosure is not limited to the above examples listed. Ordinary technical personnel in this field can improve or change the applications according to the above descriptions, all of these improvements and transforms should belong to the scope of protection in the appended claims of the present disclosure.

What is claimed is:

1. A multi-material photocuring 3D printer, comprising:
a frame;
a printing platform, arranged on the frame;
a lifting device, arranged on the printing platform;
a rotary motor, arranged on the lifting device;
a printing plate, arranged on the rotary motor, wherein a bottom surface of the printing plate is a printing plane, and wherein the rotary motor is configured to rotate the printing plate;
a locking device positioned proximate to the rotary motor, wherein the locking device is configured to contact the rotary motor to stop a rotation of the rotary motor, and wherein the locking device comprises:
a bracket;
a first cylinder, arranged on the bracket;
a clamping assembly, arranged on the first cylinder; and
a clamped piece, arranged on the rotary motor and located at a middle position of the clamping assembly;
wherein the rotary motor is a double axis high-speed DC motor, the printing plate connects to a bottom end of the rotary motor through a flange coupling, and the clamped piece is arranged on a top end of the rotary motor;
a plurality of resin slots, arranged on the frame and located below the printing plate; and
an optical engine, arranged on the frame and located below the printing plate.

2. The multi-material photocuring 3D printer according to claim 1, wherein:
the locking device is arranged on the lifting device;
wherein the rotary motor is arranged on the locking device; and
wherein the locking device contacts the rotary motor to restore the printing plate to an initial absolute position.

3. The multi-material photocuring 3D printer according to claim 1, wherein the clamping assembly comprises:
two clamping blocks, wherein the clamping blocks are arranged oppositely on the first cylinder;
a clamping permanent magnet, arranged in the clamping blocks;
wherein the clamped piece comprises:
a clamped block, arranged above the rotary motor; and
a rotary permanent magnet, arranged in the clamped block.

4. The multi-material photocuring 3D printer according to claim 1, wherein the multi-material photocuring 3D printer further comprises:
two resin collection devices, wherein the resin collection devices are arranged oppositely on the frame, and wherein the resin collection devices comprises:
a first connecting plate, arranged on the frame;
a second cylinder, arranged on the first connecting plate;
a second connecting plate, arranged on the second cylinder;
a third cylinder, arranged on the second connecting plate;
a first collection slot, arranged on the third cylinder; and
an extension direction of the third cylinder is perpendicular to an extension direction of the second cylinder.

5. The multi-material photocuring 3D printer according to claim 4, wherein the multi-material photocuring 3D printer further comprises:
two post-curing devices, wherein the post-curing devices are arranged oppositely and located on a side of the resin collection device and wherein the post-curing devices comprises:
a third connecting plate, arranged on the frame;
a fourth cylinder, arranged on the third connecting plate;
a fourth connecting plate, arranged on the fourth cylinder;
a fifth cylinder, arranged on the fourth connecting plate;
a post-curing slot, arranged on the fifth cylinder; and
a UV curing light-emitting diode, arranged on the post-curing slot;
wherein an extension direction of the fifth cylinder is perpendicular to an extension direction of the fourth cylinder.

6. The multi-material photocuring 3D printer according to claim 1, wherein, the multi-material photocuring 3D printer further comprises:
a resin slot switching device, arranged on the frame, wherein the resin slots are arranged on the resin slot switching device, and wherein the resin slot switching device comprises:
a driving assembly, arranged on the frame;
a leveling plate, arranged on the driving assembly;
a base plate, arranged on the leveling plate, wherein the resin slots are arranged on the base plate at an interval;
a plurality of first leveling assemblies, arranged on the leveling plate and connected to the base plate, wherein the first leveling assembly comprises:
a fifth connecting plate, connected to the base plate;
a first bolt, inserted through the fifth connecting plate;
a first spring, sleeved on the first bolt; and
a first screw block, arranged on the leveling plate, and threadedly connected with the first bolt.

7. The multi-material photocuring 3D printer according to claim 6, wherein the printing platform comprises:
a plurality of second adjusting assemblies, wherein the plurality of second adjusting assemblies are arranged on the bracket, and connected with the printing platform, wherein the second adjusting assembly comprises:
a second bolt, penetrating through the printing platform;
a second spring, sleeved on the second bolt; and
a second screw block, arranged on the frame and threadedly connected with the second bolt.

8. The multi-material photocuring 3D printer according to claim 6, wherein the lifting device comprises:
a first mounting dock, arranged on the printing platform;
a first driving motor, arranged on the first mounting dock and connected with the bracket;
wherein the driving assembly comprises:
a second mounting dock, arranged on the frame; and
a second driving motor, arranged on the second mounting dock and connected with the leveling plate.

* * * * *